(12) United States Patent
Roffi et al.

(10) Patent No.: US 9,631,640 B2
(45) Date of Patent: Apr. 25, 2017

(54) FLUID DISCHARGE VIBRATION DAMPING STRIPS FOR ACOUSTIC PROTECTION OF AIRCRAFT TURBOMACHINE FAN CASING

(71) Applicant: SNECMA, Paris (FR)

(72) Inventors: Guillaume Roffi, Paris (FR); Julien Tran, Pontoise (FR)

(73) Assignee: SNECMA, Paris (FR)

( * ) Notice: Subject to any disclaimer, the term of this patent is extended or adjusted under 35 U.S.C. 154(b) by 528 days.

(21) Appl. No.: 14/363,898

(22) PCT Filed: Dec. 14, 2012

(86) PCT No.: PCT/FR2012/052938
§ 371 (c)(1),
(2) Date: Jun. 9, 2014

(87) PCT Pub. No.: WO2013/088088
PCT Pub. Date: Jun. 20, 2013

(65) Prior Publication Data
US 2014/0369816 A1 Dec. 18, 2014

(30) Foreign Application Priority Data
Dec. 16, 2011 (FR) ...................... 11 61819

(51) Int. Cl.
*F04D 29/66* (2006.01)
*B64D 33/02* (2006.01)
(Continued)

(52) U.S. Cl.
CPC ........... *F04D 29/668* (2013.01); *B64D 33/02* (2013.01); *F01D 25/32* (2013.01); *F02C 7/045* (2013.01);
(Continued)

(58) Field of Classification Search
CPC .... F04D 29/668; F04D 29/663; F04D 29/664; F04D 29/526; F04D 19/002; F01D 25/32;
(Continued)

(56) References Cited

U.S. PATENT DOCUMENTS 3,542,152 A 11/1970 Adamson et al.
4,293,053 A * 10/1981 Shuttleworth .......... F02C 7/045
181/213
(Continued)

FOREIGN PATENT DOCUMENTS

WO 2010 109152 9/2010

OTHER PUBLICATIONS

International Search Report Issued May 17, 2013 in PCT/FR12/052938 Filed Dec. 14, 2012.

*Primary Examiner* — Dwayne J White
*Assistant Examiner* — Danielle M Christensen
(74) *Attorney, Agent, or Firm* — Oblon, McClelland, Maier & Neustadt, L.L.P.

(57) ABSTRACT

An acoustic protection device for a fan casing of an aircraft turbomachine, including an acoustic protection panel forming a ferrule sector centered on a center axis, and one or more vibration damping strips pressed on a first side to an external surface of the panel and on a second side to an internal surface of the casing, each damping strip including two opposite edges each including an upstream end and a downstream end spaced from each other along a direction of the center axis. At least one of both opposite edges of at least one of the damping strips is shaped such that liquid present on this edge can flow by gravity towards either or both of its upstream and downstream ends.

10 Claims, 3 Drawing Sheets

(51) Int. Cl.
  *F02C 7/045* (2006.01)
  *F01D 25/32* (2006.01)
  *F04D 19/00* (2006.01)

(52) U.S. Cl.
  CPC ......... *F04D 19/002* (2013.01); *F04D 29/663* (2013.01); *B64D 2033/0206* (2013.01)

(58) Field of Classification Search
  CPC .... F01D 25/04; F01D 11/005; F05D 2260/96; F02C 7/045; B64D 33/02
  See application file for complete search history.

(56) References Cited

U.S. PATENT DOCUMENTS

| | | |
|---|---|---|
| 4,751,979 A | 6/1988 | Wiseman |
| 4,926,963 A | 5/1990 | Snyder |
| 2006/0219475 A1 | 10/2006 | Olsen et al. |
| 2009/0321178 A1* | 12/2009 | Durchholz ............. F02C 7/045 181/141 |
| 2012/0060938 A1 | 3/2012 | Chelin et al. |
| 2012/0107125 A1 | 5/2012 | Reghezza et al. |
| 2012/0138950 A1 | 6/2012 | Roberts et al. |

\* cited by examiner

FLUID DISCHARGE VIBRATION DAMPING STRIPS FOR ACOUSTIC PROTECTION OF AIRCRAFT TURBOMACHINE FAN CASING

TECHNICAL FIELD

The invention relates to the mounting of an acoustic protection inside an aircraft turbomachine fan casing. More particularly, the invention is concerned with the vibration damping strips provided between the fan casing and the acoustic panels.

The invention is applicable to any type of aircraft equipped with a fan casing, in particular turbojet engines.

STATE OF PRIOR ART

On current turbojet engines, acoustic protection panels are generally assembled on the internal surface of the fan casing, about the engine axis. The assembly is usually performed by screwing panels to the casing.

However, risks of failure of some fixing screws of the acoustic panels have been identified. In case of failure, the screw heads released in the jet can produce high damage to the fan vanes, after ingestion. Among the main causes identified, there are the strong vibratory stresses induced by the coincidence between a fundamental mode of the acoustic panel and an excitation of the fan vanes. These strong stresses transmitted to the screws cause the loosening thereof, and are likely to cause strong wear, even possibly up to failure, as discussed above.

To cope with this problem, it has been proposed to introduce vibration damping strips in order to decrease the vibratory levels. These strips, usually made of elastomeric material, have the advantage of significantly damping the vibratory levels measured in panel testing, when these strips are compressed.

However, the selected material may be sensitive to the contact with liquids such as oil and kerosene, when dipped for a long period. This prolonged contact with such liquids can indeed cause a risk of degradation of the material and/or an efficiency loss of the damping achieved. But, in the upstream zone of the fan casing where there are the acoustic panels, oil or kerosene flows are actually possible, in case of leak.

Normally, these fluids should flow down to the low part of the fan casing, to be then discharged by a drain located at 6 o'clock at the casing.

In view of the orientation of the strips in the direction of the longitudinal axis of the engine, a retention of these liquids is then possible on some edges of the strips, which is likely to induce a detrimental prolonged contact.

To cope with this drawback, different alternatives have been proposed, such as making transverse grooves in the strips to discharge liquids.

However, the presence of these grooves can embrittle the strips, in addition to decrease the contact area with the casing, which results in a reduced efficiency. On the other hand, the presence of these grooves can also decrease the stiffness of the strips when they are compressed, which is also likely to impact their damping ability. Finally, with this solution, liquid retention zones remain on the edges, between the grooves. Consequently, this solution is not fully satisfactory.

DISCLOSURE OF THE INVENTION

The purpose of the invention is thus to overcome at least partially the above mentioned drawbacks, relative to the systems of prior art.

To do so, first, one object of the invention is to provide an acoustic protection device for a fan casing of an aircraft turbomachine, comprising an acoustic protection panel forming a ferrule sector centered on a center axis intended to be the same as the longitudinal axis of the fan casing, said device also comprising one or more vibration damping strips pressed on one side to the external surface of the acoustic protection panel and for being pressed on the other side to an internal surface of the fan casing, each damping strip having two opposites edges each having an upstream end and a downstream end spaced from each other along the direction of the center axis.

According to the invention, at least one of the two opposite edges of at least one of the damping strips is shaped such that liquid present in this edge can flow by gravity towards either or both of its upstream and downstream ends.

The invention thus provides a simple and high performance solution capable of discharging liquids towards either or both ends of the edges likely to be wetted by such liquids, as oil or kerosene.

After this discharge off the edges, allowed by a simple gravity phenomenon, the fluids can flow onto the fan casing down to the low part of the same, or at which they are preferentially discharged by a drain located at 6 o'clock on the casing.

The damping strips are therefore non longer likely to be degraded by the prolonged retention of liquids on their edges, which enables a high performance damping function to be preserved for a long time.

Preferably, the arrangement specific to the present invention is provided on each edge of each strip likely to collect fluid dripping by gravity on the lower surface of the casing, that is generally a single edge per band, this being oriented upwards.

Preferably, at least one of both opposite edges of at least one of the damping strips has at least one portion tilted with respect to the center axis, such that liquid present on this portion can flow by gravity towards either or both of its upstream and downstream ends. The tilted portion is preferentially planar, but can alternatively be curved. Each edge concerned can include here only a single tilted portion, preferably making up the entire edge.

Preferentially, at least one of the two opposed edges of at least one of the damping strips consists of two successive portions in the direction of the center axis, each of both portions being tilted along the center axis such that liquid present on each of both portions can flow by gravity towards the upstream end and the downstream end respectively. This enables the liquid to be distributed towards both upstream and downstream ends of the edge concerned, and a possible liquid overflow at one of its ends, and a spilling into the jet. In order to evenly distribute the flow onto both ends of the strip, the two tilted portions, arranged as downwardly open V, can be symmetrical.

In this regard, the angle formed between both edge portions is preferably between 1 and 15°, and more preferably between 1 and 3°. With these ranges of values, a compromise was reached, enabling both a good liquid flow by gravity, and a negligible decrease in the contact area of the strip with its adjacent elements.

As discussed above, both edge portions are at the same length, and symmetrically arranged.

Preferably, at least one of the damping strips is shaped so as to be mountable onto the acoustic panel at two reversed mounting positions, wherein the positions of said two opposite edges are respectively reversed, and in that in each of both mounting positions, at least one the two opposite edges of said damping strip is shaped such that liquid present on this edge can flow by gravity towards either or both of its upstream and downstream ends.

This solution avoids the detrimental consequences on the strips in case of a mounting mistake, since in both mounting directions, the edge likely to collect liquids, that is the one oriented upwards, will be able to lead the liquids by gravity up to either or both ends of this edge, to provide for discharge thereof.

In the same way, and still for the purpose of avoiding detrimental consequences on the bands in the case of a possible mounting mistake, at least one of the damping strips has a first plan of symmetry arranged between the two opposite edges. Preferably, all the strips have an identical shape, which still further simplifies the mounting.

Still preferentially, at least one of the damping strips has a second plan of symmetry passing through both opposite edges, said first and second plans of symmetry being preferentially orthogonal between them, and also orthogonal to the strip plan when the same has a substantially planar surface.

Finally, as discussed above, each damping strip is preferably made of an elastomeric material.

An other object of the invention is also to provide an aircraft turbomachine front part comprising a fan casing the internal surface of which is coated with at least one acoustic protection device such as described above.

Further advantages and characteristics of the invention will be more apparent in the non limiting detailed description below.

BRIEF DESCRIPTION OF THE DRAWINGS

This description will be made with regard to the appended drawings wherein.

DETAILED DESCRIPTION OF THE PREFERRED EMBODIMENTS

Figure 1:
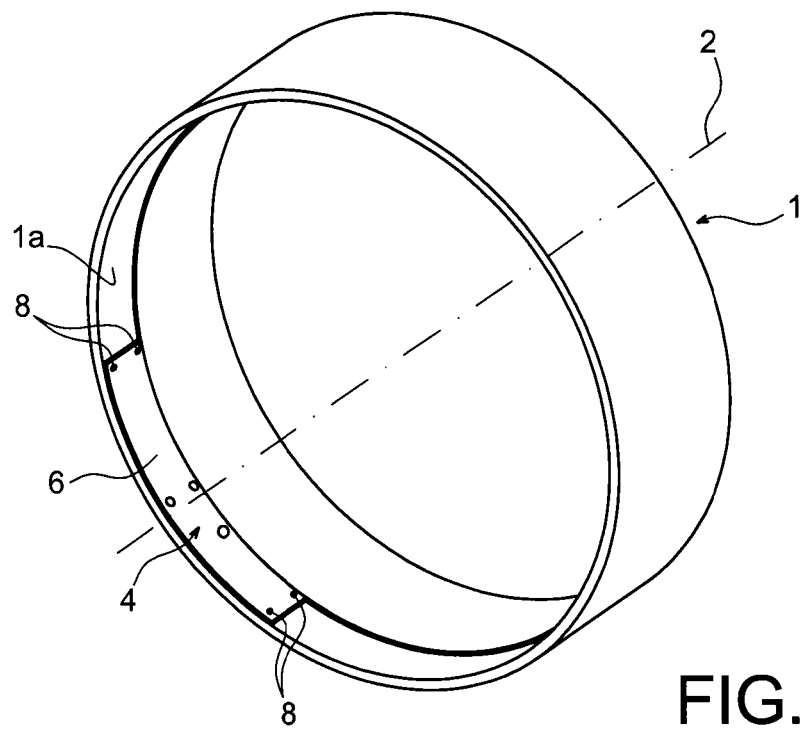
FIG. 1 shows a perspective view of an aircraft turbojet engine fan casing, equipped with an acoustic protection device according to a preferred embodiment of the invention.
Figure 2:
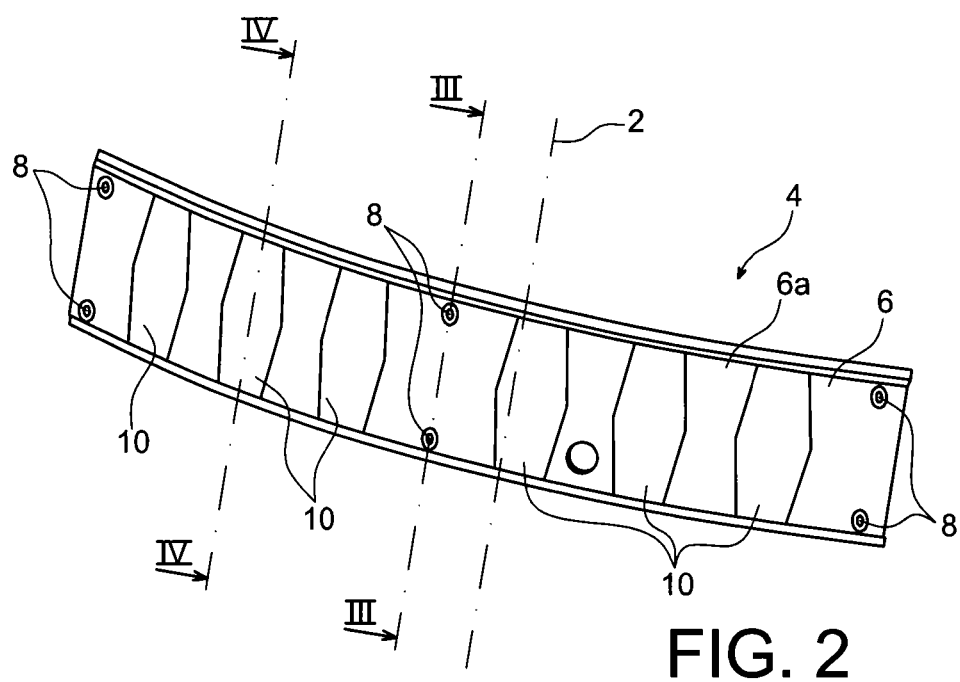
FIG. 2 represents a perspective view of the acoustic protection device shown in the preceding figure, at an angle enabling its internal surface to be seen.

First in reference to FIG. 1, is represented a fan casing 1 intended to be an integral part of a front part of an aircraft turbojet engine, preferably of the two flow twin-spool type.

The casing assumes a conventional ferrule shape, with a longitudinal axis 2 corresponding to the longitudinal axis of the turbojet engine assembly.

At its upstream end, the internal surface 1a of the casing 1a is equipped with a plurality of acoustic protection devices 4, only one of which has been represented in FIG. 1.

This device 4 includes an acoustic protection panel 6 forming a ferrule sector centered on a center axis the same as the longitudinal axis 4. When all the protection devices are installed on the casing, their panels 6 located in the continuity of each other along the circumferential direction form an internal acoustic protection ring together.

The panel 6 is preferentially assembled by screwing on the casing, the fixing screws 8 being mounted hidden in the panel so as not to disturb the streamline flow of the jet.

The device 2 also comprises one or more vibration damping strips 10 pressed on one side to the external surface 6a of the panel 6, and for being pressed on the other side to the internal surface 1a of the casing 1.

The strips 10, spaced apart from each other along the circumferential direction, are made of elastomeric material. They are generally oriented parallel to the axis 2, that is they have their length parallel to this axis, and their width orthogonal to the same axis 2. In the preferred embodiment represented, each strip 10 has a low width, enabling it to preserve a substantially planar shape, but it could alternatively be curved, without departing from the scope of the invention.

Figure 3:
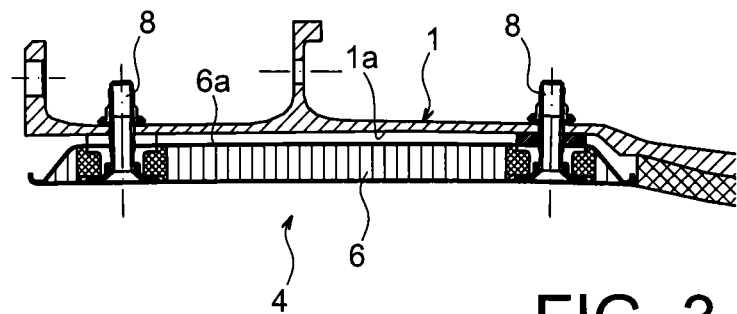
FIGS. 3 and 4 respectively represent cross section views taken along lines III-III and IV-IV of FIG. 2, respectively.
Figure 4:
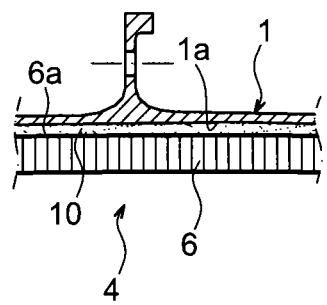

FIG. 3 shows the panel 6 assembled on the casing 1 by the screws 8, whereas FIG. 4 shows the interposition of one of the damping strips 10 between both surfaces 1a, 6a between which this strip is compressed in order to provide its vibration damping function.

Figure 5:
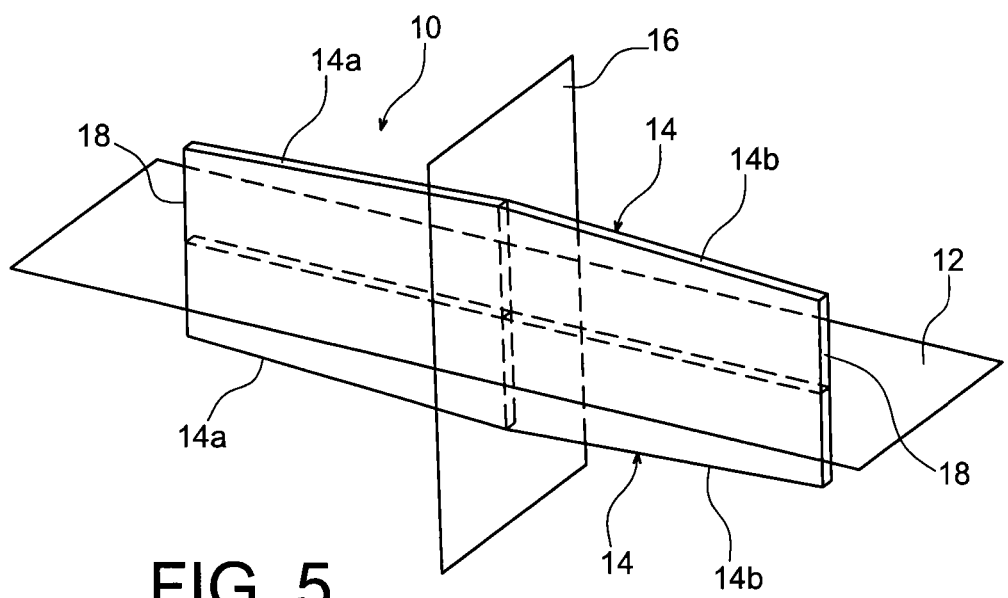
FIG. 5 represents a perspective view of one of the vibration damping strips equipping the acoustic protection device shown in the preceding figures.
Figure 6:
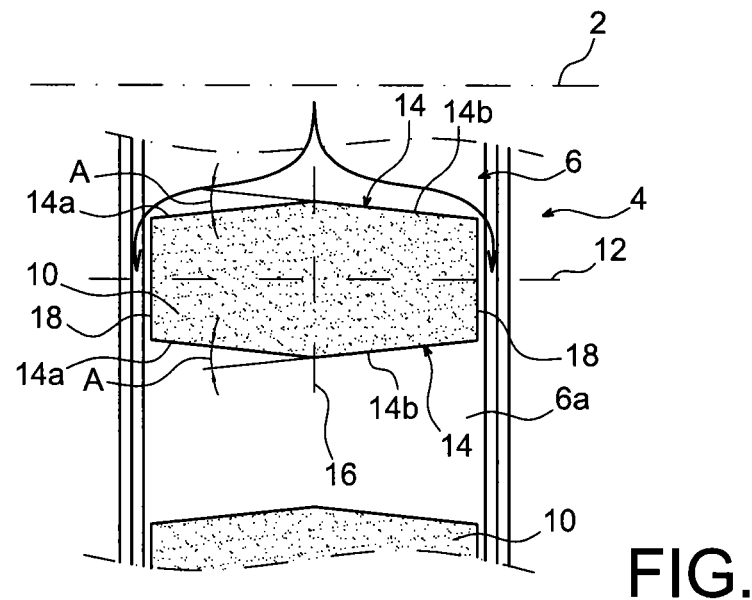
FIG. 6 represents a side view of an acoustic protection device part shown in the preceding figures.

FIGS. 5 and 6 more precisely show one of the strips 10, as well as its arrangement on the casing. In this regard, it is noted that to make the mounting easier, all the strips 10 of the device 4 are provided to be identical.

Here, the strip 10 has a first plan of symmetry 12 orthogonal to the axis 2, and corresponding to a median plan passing between the two longest opposite edges, called longitudinal edges 4. On the other hand, the strip 10 has also a second plan of symmetry 16 orthogonal to the first plan 12, and corresponding to a median plan passing between the shortest two opposite edges, called transverse edges 18. Both plans 12, 16 are orthogonal to the plan of the strip 10, the transverse edges 18 of which are parallel to the first plan 12. Consequently, in a side view as shown in FIG. 6, the edges 18 are considered as vertical edges.

One of the features of the present invention resides in the shape of the longitudinal edges 14, which are not oriented along the direction of the longitudinal axis 2, itself also oriented horizontally in use. Indeed, each longitudinal edge 14 extends between an upstream end and a downstream end spaced from each other along the direction of the center axis 2, by consisting of two successive portions 14a, 14b in the direction of the same axis 2, tilted with respect to each other, and each substantially planar. Both portions of the longitudinal edge 14a, 14b, of a substantially identical length, form an angle preferably between 1 and 3°.

It is noted that the damping strip 10 is shaped so as to be mountable to the panel 6 at two reversed mounting positions, wherein the positions of both opposite longitudinal edges 14 are respectively reversed, that is that in one of both positions, one of the edges is usually oriented upwards, whereas it is oriented downwards in the other position. Because of the symmetry of the strip 10 along the first plan 14, regardless of the mounting direction adapted, the strip has a same configuration on the panel 6. Therefore, a mounting mistake can not happen, since in both mounting directions, the longitudinal edge 14 likely to collect liquid leaks, that is the one oriented upwards, will be able to lead liquids by gravity up to both ends of this edge, to provide discharge thereof.

Indeed, by being tilted along the center axis 2 horizontally oriented in use, each of the two edge portions 14a, 14b can lead by gravity a collected liquid, for example an oil and/or kerosene leak, to the edge end it integrates. In other words, once the liquid flowing on the internal surface 1a of the casing is deposited onto the upwardly oriented longitudinal edge 14, it flows by gravity to the upstream or downstream end of this edge by being confined between the same edge, the external surface 6a of the panel, and the internal surface 1a of the casing. After reaching the transverse upstream or downstream edge 18, the liquid can then flow between both surfaces 1a, 6a down to the low part of the blower casing, to be then discharged through a drain (not shown) located at 6 o'clock at the casing 1.

Each upwardly oriented edge 14 is related to a facet/rim enabling, by virtue of its tilting(s) with respect to the horizontal direction, discharge of liquid leaks remote from the damping strips 10.

Figure 7:
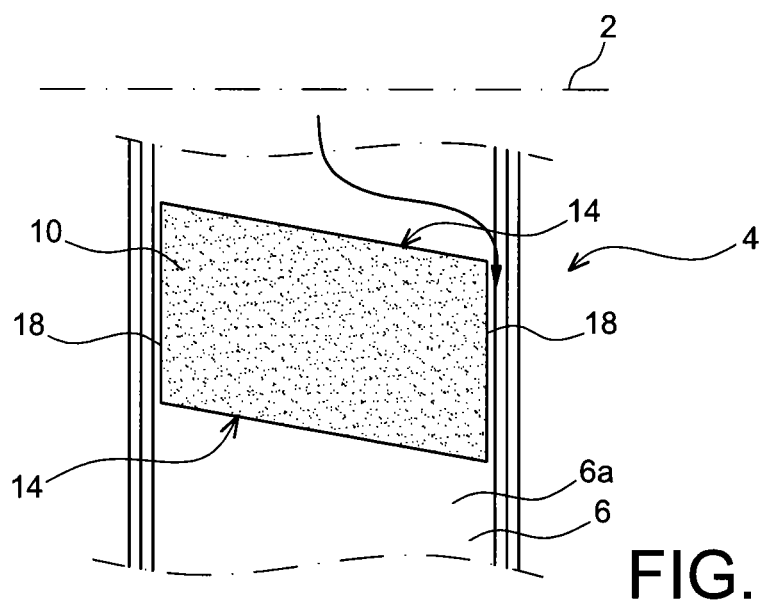
FIG. 7 represents a view similar to that of the preceding view, according to an alternative embodiment.

FIG. 7 shows an alternative to make the strips 10, each herein taking a generally parallelogram shape with each longitudinal edge 14 consisting of a single portion tilted with respect to the center axis 2, so as to form a slope dedicated to the pouring of the liquid to one of the edge ends, herein the downstream end.

Of course, various alterations can be made by those skilled in the art to the invention just described, only by way of non limiting examples.

The invention claimed is:

1. An acoustic protection device for a fan casing of an aircraft turbomachine, comprising:
    an acoustic protection panel forming a ferrule sector centered on a center axis same as a longitudinal axis of the fan casing;
    one or more vibration damping strips pressed on a first side to an external surface of the acoustic protection panel and being pressed on a second side to an internal surface of the fan casing, each damping strip including two opposite edges each including an upstream end and a downstream end spaced from each other along the direction of the center axis,
    wherein at least one of the two opposite edges of at least one of the damping strips is shaped such that liquid present in this edge can flow by gravity toward either or both of its upstream and downstream ends.

2. The device according to claim 1, wherein at least one of the two opposite edges of at least one of the damping strips includes at least one portion tilted with respect to the center axis, such that liquid present on this portion can flow by gravity toward either or both of its upstream and downstream ends.

3. The device according to claim 2, wherein at least one of the two opposite edges of at least one of the damping strips includes two successive portions in a direction of the center axis, each of both portions being tilted along the center axis such that liquid present on each of both portions can flow by gravity toward the upstream end and the downstream end respectively.

4. The device according to claim 3, wherein an angle formed between the two edge portions is between 1° and 15°, or between 1° and 3°.

5. The device according to claim 3, wherein the two edge portions are a same length.

6. The device according to claim 1, wherein at least one of the damping strips is shaped to be mountable on the acoustic panel at two reversed mounting positions, wherein the positions of the two opposite edges are respectively reversed, and in each of both mounting positions, at least one of both opposite edges of the damping strip is shaped such that liquid present on this edge can flow by gravity toward either of both of its upstream and downstream ends.

7. The device according to claim 1, wherein at least one of the damping strips has a first plane of symmetry arranged between the two opposite edges.

8. The device according to claim 7, wherein at least one of the damping strips has a second plane of symmetry passing through both opposite edges.

9. The device according to claim 1, wherein each damping strip is made of an elastomeric material.

10. An aircraft turbomachine front part comprising a fan casing with an internal surface coated with at least one acoustic protection device according to claim 1.

* * * * *